US010829414B2

(12) United States Patent
Thomas et al.

(10) Patent No.: US 10,829,414 B2
(45) Date of Patent: *Nov. 10, 2020

(54) SETTABLE COMPOSITIONS COMPRISING REMEDIATED FLY ASH (RFA) AND METHODS OF CEMENTING IN SUBTERRANEAN FORMATIONS

(71) Applicant: CR Minerals Company, LLC, Ohkay Owingeh, NM (US)

(72) Inventors: Joseph Earl Thomas, Malad City, ID (US); Jeffrey Alexander Whidden, Brentwood, MO (US)

(73) Assignee: CR Minerals Company, LLC, Fort Worth, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/577,168

(22) Filed: Sep. 20, 2019

(65) Prior Publication Data
US 2020/0010363 A1 Jan. 9, 2020

Related U.S. Application Data

(63) Continuation of application No. 15/894,203, filed on Feb. 12, 2018, now Pat. No. 10,457,601.

(60) Provisional application No. 62/463,079, filed on Feb. 24, 2017.

(51) Int. Cl.
| C04B 14/14 | (2006.01) |
| C04B 18/08 | (2006.01) |
| C04B 28/04 | (2006.01) |
| C09K 8/467 | (2006.01) |
| C04B 40/00 | (2006.01) |
| C04B 111/21 | (2006.01) |
| C04B 111/20 | (2006.01) |

(52) U.S. Cl.
CPC .............. *C04B 14/14* (2013.01); *C04B 18/08* (2013.01); *C04B 28/04* (2013.01); *C04B 40/0039* (2013.01); *C09K 8/467* (2013.01); *C04B 2111/2015* (2013.01); *C04B 2111/2023* (2013.01); *C04B 2111/21* (2013.01); *Y02W 30/92* (2015.05); *Y02W 30/94* (2015.05)

(58) Field of Classification Search
CPC ......... C04B 14/14; C04B 18/08; C04B 28/04; C04B 40/0039; C04B 2111/21; C04B 2111/2015; C04B 2111/2023; C09K 8/467
See application file for complete search history.

(56) References Cited

U.S. PATENT DOCUMENTS

| 4,642,137 | A | ‡ | 2/1987 | Heitzmann | ........... C04B 12/005 106/60 |
| 4,842,649 | A | ‡ | 6/1989 | Heitzmann | ............ C04B 24/26 106/70 |
| 4,992,102 | A | ‡ | 2/1991 | Barbour | .................... C04B 7/26 106/645 |
| 4,997,487 | A | ‡ | 3/1991 | Vinson | ..................... C04B 24/38 106/72 |
| 5,223,035 | A | ‡ | 6/1993 | Hopkins | ................. C04B 28/18 106/70 |
| 5,261,461 | A | ‡ | 11/1993 | Smith | .................. F16L 55/1657 137/61 |
| 5,352,288 | A | ‡ | 10/1994 | Mallow | ................... C04B 28/18 106/60 |
| 5,762,701 | A | | 6/1998 | Biagini | |
| 6,277,189 | B1 | ‡ | 8/2001 | Chugh | .................. C04B 28/021 106/64 |
| 7,101,430 | B1 | ‡ | 9/2006 | Pike | ........................ C04B 28/04 106/70 |
| 8,261,827 | B2 | ‡ | 9/2012 | Roddy | .................. C04B 28/021 106/67 |
| 8,307,899 | B2 | ‡ | 11/2012 | Brenneis | ............... C04B 28/021 106/70 |

(Continued)

FOREIGN PATENT DOCUMENTS

| CN | 87100904 A | 8/1988 |
| CN | 102007085 | 4/2011 |

(Continued)

OTHER PUBLICATIONS

"Fly Ash Facts for Highway Engineers", American Coal Ash Association, Report No. FHW A-IF-03-019, pp. 1-74.‡
Sinsiri et al. "The effects of replacement fly ash with diatomite in geopolymer mortar"; Computers and Concrete, vol. 9, No. 6 (2012), pp. 427-437.‡
European Search Report for European patent application No. 15812436.2 dated Jan. 23, 2018.‡
Phoo-ngernkham et al. "High calcium fly ash geopolymer containing diatomite as additive", Indian Journal of Engineering & Materials Science, vol. 20, Aug. 2013, pp. 310-318.‡

(Continued)

*Primary Examiner* — Anthony J Green
(74) *Attorney, Agent, or Firm* — O'Connor & Company; Ryan P. O'Connor

(57) ABSTRACT

Some embodiments of the present invention comprise a method of cementing comprising: placing a settable composition into a well bore, the settable composition comprising RFA, hydraulic cement, and water; and allowing the settable composition to set. Other embodiments comprise a method of cementing comprising: placing a settable composition into a well bore, the settable composition comprising RFA, calcium hydroxide (lime), and water; and allowing the settable composition to set. Other embodiments comprise a settable composition comprising: RFA, hydraulic cement, calcium hydroxide, natural pozzolan and water; and allowing the composition to set. Other embodiments comprise a settable composition comprising RFA and any combination of hydraulic cement, calcium hydroxide, slag, fly ash, and natural or other pozzolan.

19 Claims, 4 Drawing Sheets

(56) References Cited

U.S. PATENT DOCUMENTS

| | | | |
|---|---|---|---|
| 8,486,869 B2 ‡ | 7/2013 | Brenneis | C04B 28/021 |
| | | | 106/61 |
| 8,876,027 B2 | 11/2014 | Oehr | |
| 9,067,824 B1 ‡ | 6/2015 | Hansen | C04B 7/12 |
| 9,254,490 B2 | 2/2016 | Pike, Sr. | |
| 9,561,983 B2 ‡ | 2/2017 | Thomas | C04B 28/02 |
| 9,611,174 B2 ‡ | 4/2017 | Thomas | C04B 28/02 |
| 9,908,814 B1 | 3/2018 | Young | |
| 10,017,418 B2 | 7/2018 | Thomas et al. | |
| 10,370,295 B2 | 8/2019 | Thomas et al. | |
| 10,377,667 B2 | 8/2019 | Thomas et al. | |
| 10,457,601 B2 * | 10/2019 | Thomas | C04B 40/0039 |
| 2002/0033119 A1 ‡ | 3/2002 | Styron | C04B 28/04 |
| | | | 106/70 |
| 2003/0233962 A1 ‡ | 12/2003 | Dongell | C04B 28/02 |
| | | | 106/70 |
| 2004/0231566 A1 | 11/2004 | Wang | |
| 2006/0201395 A1 ‡ | 9/2006 | Barger | C04B 28/02 |
| | | | 106/70 |
| 2007/0184394 A1 ‡ | 8/2007 | Comrie | C04B 7/364 |
| | | | 431/2 |
| 2009/0105099 A1 ‡ | 4/2009 | Warrender | C09K 8/467 |
| | | | 507/26 |
| 2010/0089293 A1 ‡ | 4/2010 | Guynn | C04B 28/02 |
| | | | 106/70 |
| 2010/0212551 A1 ‡ | 8/2010 | Meille | C04B 28/02 |
| | | | 106/70 |
| 2010/0237158 A1 | 9/2010 | Hou | |
| 2011/0196069 A1 ‡ | 8/2011 | Sebastien | C04B 24/28 |
| | | | 524/2 |
| 2014/0187680 A1 ‡ | 7/2014 | Kripavicius | C04B 28/04 |
| | | | 524/5 |
| 2015/0376061 A1 ‡ | 12/2015 | Thomas | C04B 28/02 |
| | | | 106/70 |
| 2018/0297895 A1 | 10/2018 | Thomas et al. | |

FOREIGN PATENT DOCUMENTS

| | | | |
|---|---|---|---|
| CN | 102311292 | ‡ | 1/2012 |
| CN | 102617067 | ‡ | 1/2012 |
| JP | 51-71306 | ‡ | 6/1976 |
| JP | H02-248350 | | 10/1990 |
| JP | H04-500065 | | 1/1992 |
| JP | H04-42849 | | 2/1992 |
| JP | H04-331750 | | 11/1992 |
| JP | 2001-64066 | | 12/2001 |
| JP | 2001-19529 | | 8/2002 |
| JP | 2006-515260 | | 5/2006 |
| JP | 2006-291085 | ‡ | 10/2006 |
| JP | 2008-515759 | | 5/2008 |
| JP | 2009-507746 | | 2/2009 |
| JP | 2010-532309 | | 10/2010 |
| JP | 2011-195364 | | 10/2011 |
| KR | 2002-0067674 | ‡ | 8/2002 |
| KR | 2003-0039813 | | 5/2003 |
| KR | 10-2014-0015648 | | 2/2014 |
| WO | WO 2003/070655 | ‡ | 8/2003 |
| WO | WO 2013/147608 | ‡ | 10/2013 |
| WO | WO 2015/152881 | ‡ | 10/2015 |

OTHER PUBLICATIONS

Derwent-Acc-No. 2012-M88459, abstract of Chinese Patent Specification No. CN 102617067 A (Aug. 2012).‡
Derwent-Acc-No. 2014-D83500, abstract of Korean Patent Specification No. KR 1363893 B1 (Feb. 2014).‡
Derwent-Acc-No. 2014-J38032, abstract of Chinese Patent Specification No. CN 103664026A (Mar. 2014).‡
International Search Report for International application No. PCT/US2015/037399 dated Sep. 15, 2015.‡
International Search Report for PCT application No. PCT/US2018/017916 dated Apr. 9, 218.‡
International Search Report for PCT patent application No. PCT/US2018/017916 dated Apr. 9, 2018.
Japanese Office Action dated May 28, 2019 for Japanese Patent Application No. 2017-520740.
Chinese Office Action dated Apr. 17, 2019 for Chinese patent application No. 2015800457787 with English translation summary, 8 pages.
Chinese Office Action dated Aug. 20, 2018 for Chinese Patent application No. 2015800457787 with English translation summary, 10 pages.

\* cited by examiner
‡ imported from a related application

FIG. 1

| Exp. No. | Description | Cement[a] TI/II | Class F Fly Ash | Natural Pozzolan | Lime | Tephra® RFA | 7 Day Strength, 73°F | 28 Day Strength 73°F |
|---|---|---|---|---|---|---|---|---|
| 1 | Cement | 100 wt% | 0 | 0 | 0 | 0 | 5595 psi | 7288 psi |
| 2 | Cement/FA[b] | 60 wt% | 40 wt% | 0 | 0 | 0 | 2398 psi | 4998 psi |
| 3 | Cement/FA/NP[c] | 60 wt% | 20 wt% | 20 wt% | 0 | 0 | 3637 psi | 5904 psi |
| 4 | Cement/FA/Lime | 60 wt% | 20 wt% | 0 | 20 wt% | 0 | 2760 psi | 5001 psi |
| 5 | Lime/FA | 0 | 74 wt% | 0 | 26 wt% | 0 | *ist*[d] | 1564 psi |
| 6 | Lime/FA/NP | 0 | 37 wt% | 37 wt% | 26 wt% | 0 | *ist* | 2227 psi |

Notes:
[a] All mixes at water/solids weight ratio = 0.5 with no water reducer or other admixtures.
[b] FA means Class F fly ash.
[c] NP means natural pozzolan.
[d] *ist* means insufficient strength for compression testing.

FIG. 2

| Exp. No. | Description | Cement[a] TI/II | Class F Fly Ash | Natural Pozzolan | Lime | Tephra® RFA | 7 Day Strength, 73°F | 28 Day Strength 73°F |
|---|---|---|---|---|---|---|---|---|
| 7 | Cement/RFA[b] | 60 wt% | 0 | 0 | 0 | 40 wt% | 5329 psi | 7320 psi |
| 8 | Cement/RFA/FA[c] | 60 wt% | 0 | 20 wt% | 0 | 20 wt% | 3629 psi | 6303 psi |
| 9 | Cement/RFA/NP[d] | 60 wt% | 20 wt% | 0 | 0 | 20 wt% | 4977 psi | 6960 psi |
| 10 | Cement/RFA/FA/NP | 60 wt% | 10 wt% | 10 wt% | 0 | 20 wt% | 4412 psi | 6432 psi |

Notes:
[a] All mixes at water/solids weight ratio = 0.5 with no water reducer or other admixtures.
[b] RFA means remediated fly ash, in this case Tephra® RFA.
[c] FA means Class F fly ash.
[d] NP means natural pozzolan.

FIG. 3

| Exp. No. | Description | Cement[a] TI/II | Class F Fly Ash | Natural Pozzolan | Lime | Tephra® RFA | 7 Day Strength, 73°F | 28 Day Strength 73°F |
|---|---|---|---|---|---|---|---|---|
| 11 | Cement/RFA[b]/Lime | 30 wt% | 0 | 0 | 13 wt% | 57 wt% | 3119 psi | 5227 psi |
| 12 | Cement/Lime/RFA/FA[c] | 30 wt% | 28.5 wt% | 0 | 13 wt% | 28.5 wt% | 2399 psi | 4345 psi |
| 13 | Cement/Lime/RFA/NP[d] | 30 wt% | 0 | 28.5 wt% | 13 wt% | 28.5 wt% | 2465 psi | 4598 psi |
| 14 | Cement/Lime/RFA/FA/NP | 30 wt% | 14.25 wt% | 14.25 wt% | 13 wt% | 28.5 wt% | 2342 psi | 4443 psi |

Notes:
[a] All mixes at water/solids weight ratio = 0.5 with no water reducer or other admixtures.
[b] RFA means remediated fly ash, in this case Tephra® RFA.
[c] FA means Class F fly ash.
[d] NP means natural pozzolan.

FIG. 4

| Exp. No. | Description | Cement[a] TI/II | Class F Fly Ash | Natural Pozzolan | Lime | Tephra® RFA | 7 Day Strength, 73°F | 28 Day Strength 73°F |
|---|---|---|---|---|---|---|---|---|
| 15 | Lime/RFA[b] | 0 | 0 | 0 | 26 wt% | 74 wt% | *ist*[e] | 3007 psi |
| 16 | Lime/RFA/FA[c] | 0 | 37 wt% | 0 | 26 wt% | 37 wt% | *ist* | 1714 psi |
| 17 | Lime/RFA/NP[d] | 0 | 0 | 37 wt% | 26 wt% | 37 wt% | *ist* | 3448 psi |
| 18 | Lime/RFA/FA/NP | 0 | 18.5 wt% | 18.5 wt% | 26 wt% | 37 wt% | *ist* | 3399 psi |

Notes:

[a] All mixes at water/solids weight ratio = 0.5 with no water reducer or other admixtures.

[b] RFA means remediated fly ash, in this case Tephra® RFA.

[c] FA means Class F fly ash.

[d] NP means natural pozzolan.

[e] *ist* means insufficient strength for compression testing.

SETTABLE COMPOSITIONS COMPRISING REMEDIATED FLY ASH (RFA) AND METHODS OF CEMENTING IN SUBTERRANEAN FORMATIONS

PRIORITY DATA

This patent application is a continuation application of U.S. Pat. No. 10,457,601, issued on Oct. 29, 2019, which is a non-provisional application of U.S. Provisional Patent App. No. 62/463,079, filed on Feb. 24, 2017, each of which is hereby incorporated by reference herein.

FIELD OF THE DISCLOSURE

The present invention relates to cementing operations and, more particularly to methods and compositions that comprise remediated fly ash (RFA) with hydraulic cement, calcium hydroxide, Type S lime, natural pozzolan, fly ash, silica fume, ground glass, slag, or a combination thereof.

BACKGROUND OF THE DISCLOSURE

Molten lava, flash frozen upon explosive expulsion from the volcanic vent, instantly became what the Romans called "pozzolana"—pumice pozzolan, the key ingredient in Roman concrete. Roman structures such as aqueducts used volcanic ash as pozzolan in their concrete. Concretes using natural (pumice) pozzolan have proven to last thousands of years. Pozzolans fortify concrete, providing protection by mitigating various forms of chemical attack such as alkali-silica reaction (ASR), sulfate induced expansion, efflorescence, as well as rebar oxidation and debondment caused by the ingress of chlorides. Pozzolans also densify concrete, reducing porosity and permeability, thereby reducing chemical ingress and increasing long-term compressive strength and durability.

Fly ash, also known as flue-ash, is one of the residues generated in coal combustion and comprises the fine particles that rise with the flue gases. In an industrial context, fly ash usually refers to ash produced during combustion of coal. Fly ash is generally captured by electrostatic precipitators or other particle filtration equipment before the flue gases reach the chimneys of coal-fired power plants. Depending upon the source and makeup of the coal being burned, the components of fly ash vary considerably, but all fly ash includes substantial amounts of silica (silicon dioxide, $SiO_2$), alumina (aluminum oxide, $Al_2O_3$), iron oxide ($Fe_2O_3$), calcium oxide (CaO), and various metals.

In the past, fly ash was generally released into the atmosphere, but pollution control mandated in recent decades now requires that it be captured prior to release. Fly ash, particularly Class F fly ash, can be used as a pozzolan to enhance hydraulic cement or hydraulic plaster. Fly ash can be used as a replacement for some of the Portland cement content of concrete. Fly ash has historically been available at much lower cost than natural pozzolans as it is a waste material of coal-fired power plants with associated disposal costs.

Fly ash pozzolan, which is typically less expensive than a natural pozzolan, is generally used when chemical attack, such as alkali-silica reaction (ASR), is not expected to be severe. Furthermore, fly ash pozzolan is preferred when concrete with a low water-to-cement ratio is desirable. In general, fly ash generally creates less water demand than does a natural pozzolan. However, when chemical attack, such as ASR, is expected to be severe, a natural pozzolan is generally more effective at the same replacement rates used for fly ash.

Two classes of fly ash are defined by ASTM C618: Class F fly ash and Class C fly ash. The primary difference between these classes is the amount of calcium, silica, alumina, and iron content in the ash. The chemical properties of the fly ash are largely influenced by the chemical content of the coal burned.

The burning of harder, older anthracite, bituminous and lignite coals typically produces Class F fly ash. This fly ash is pozzolanic in nature, and contains less than 20% lime (CaO). Possessing pozzolanic properties, the glassy silica and alumina of Class F fly ash requires a cementing agent, such as Portland cement, quicklime, or hydrated lime, with the presence of water in order to react and produce cementitious compounds. Calcium Hydroxide ($Ca(OH)_2$), the major byproduct of the hydraulic reaction between cement and water, is the key chemical with which pozzolan reacts to form additional Calcium Silicate Hydrate (C-S-H), the binder in all Portland cement-based concretes.

Fly ash produced from the burning of younger lignite or subbituminous coal, Class C fly ash, in addition to having pozzolanic properties, also has some self-cementing properties. In the presence of water, Class C fly ash will harden and gain strength over time. Class C fly ash generally contains more than 18% lime (CaO). Unlike Class F fly ash, self-cementing Class C fly ash does not require an activator.

For the coal power industry, concrete has been a convenient market for fly ash. For companies making or using concrete, fly ash has been a low-cost source of pozzolans. However, recently, a supply problem has started to emerge. Namely, due to increasing environmental regulations of power plants, the quantity and quality of fly ash has been decreasing. There is a declining availability of fly ash, particularly Class F fly ash, of suitable quality for use as a pozzolan in concrete. This situation is expected to worsen in the coming years.

In cementing methods, such as oil well construction and remedial cementing, as well as geothermal and water well construction, settable compositions are commonly utilized. As used herein, the term "settable composition" refers to a composition that hydraulically sets or otherwise develops compressive strength. Settable compositions may be used in primary cementing operations whereby pipe strings, such as casing and liners, are cemented in well bores. In performing primary cementing, a settable composition may be pumped into an annulus between a subterranean formation and the pipe string disposed in the subterranean formation. The settable composition should set in the annulus, thereby forming an annular sheath of hardened cement (e.g., a grout sheath) that should support and position the pipe string in the well bore and bond the exterior surface of the pipe string to the walls of the well bore. Settable compositions also may be used in remedial cementing methods, such as the placement of cement plugs, and in squeeze cementing for sealing voids in a pipe string, cement sheath, gravel pack, formation, and the like.

There is a need in the art for improved settable compositions containing cement for oil-field applications and other cementing and concrete applications, and methods of using these settable compositions.

SUMMARY

Some variations provide a settable composition for cementing, the settable composition comprising (a) remediated fly ash ("RFA"), (b) cement and/or calcium hydroxide, and (c) optionally water, wherein the remediated fly ash contains fly ash and a natural or other pozzolan, and wherein the natural or other pozzolan is present in the remediated fly ash in a concentration of about 1 wt % to about 99 wt %.

The natural or other pozzolan may be a pozzolanic volcanic ash. In some embodiments, the natural or other pozzolan is derived from pumice, perlite, ignimbrites, or any other volcanic material. In various embodiments, the natural or other pozzolan is selected from the group consisting of pumice, pumicite, perlite, volcanic ash, metakaolin, diatomaceous earth, silica fume, precipitated silica, colloidal silica, ignimbrites, vitrified calcium alumino-silicates, ground waste glass, calcined shale, calcined clay, zeolites, and combinations thereof.

The remediated fly ash may be certified under ASTM C618, ASTM C1697, and/or AASHTO M295 as a Class C pozzolan or a Class F pozzolan. In some embodiments, the remediated fly ash includes Tephra® RFA. In certain settable-composition embodiments, the remediated fly ash consists essentially of Tephra® RFA.

The remediated fly ash may be characterized by a mean particle size of about 1 micron to about 400 microns. The remediated fly ash may be present in an amount of about 1% to about 80% by weight of cementitious components in the settable composition.

In some embodiments, the remediated fly ash further contains slag, preferably (but not limited to) ground-granulated blast-furnace slag.

In some embodiments, the settable composition has a density of about 8 pounds per gallon to about 16 pounds per gallon.

When the settable composition comprises cement, the cement may be Portland cement, for example. When the settable composition comprises calcium hydroxide, the calcium hydroxide may be present in the form of Type S lime that itself forms a part of the settable composition.

The settable composition may further comprise at least one additive selected from the group consisting of fly ash, slag, natural pozzolan, crystalline silica, amorphous silica fume, fumed silica, sodium hydroxide, calcium chloride, sodium chloride, glass fiber, polymer fiber, hydratable clay, biomass ash, crushed glass, elastomers, polymer resins, latexes, and combinations thereof.

The composition may further comprise at least one additive selected from the group consisting of a set retarding additive, a strength-retrogression additive, a set accelerator, a weighting agent, an aggregate, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, a water reducing additive, and combinations thereof.

When water is present in the settable composition, the water may be present in an amount of about 25% to about 200% by weight of cementitious components, for example. The water may be derived from a water source selected from the group consisting of culinary water, freshwater, saltwater, brine, seawater, recycled water, and combinations thereof. The settable composition may be provided without any water or with a reduced water content, and then at a later time, the desired amount of water may be added to the settable composition.

Some variations provide a structure (e.g., cement sheath) containing a hardened material derived from a settable composition comprising:

(a) remediated fly ash;
(b) one or more of: (i) cement, (ii) calcium hydroxide, or (iii) Type S lime; and
(c) water,
wherein the remediated fly ash contains fly ash and a natural or other pozzolan, and wherein the natural or other pozzolan is present in the remediated fly ash in a concentration of about 1 wt % to about 99 wt %.

Other variations provide a method of cementing comprising placing a settable composition into a well bore and allowing the settable composition to set, wherein the settable composition comprises:

(a) remediated fly ash;
(b) one or more of: (i) cement, (ii) calcium hydroxide, or (iii) Type S lime; and
(c) water,
wherein the remediated fly ash contains fly ash and a natural or other pozzolan.

In some embodiments, the remediated fly ash includes, or consists essentially of, Tephra® RFA.

The remediated fly ash may be characterized by a mean particle size of about 1 micron to about 400 microns. The remediated fly ash may be present in an amount sufficient to increase compressive strength of the settable composition, compared to an otherwise-equivalent settable composition without the remediated fly ash. In some embodiments, the remediated fly ash is present in an amount of about 1% to about 80% by weight of cementitious components in the settable composition.

When the settable composition comprises cement, the cement may be Portland cement or another type of cement.

In various methods, the settable composition further comprises at least one additive selected from the group consisting of fly ash, slag, natural pozzolan, crystalline silica, amorphous silica fume, fumed silica, sodium hydroxide, calcium chloride, sodium chloride, glass fiber, polymer fiber, hydratable clay, biomass ash, crushed glass, elastomers, polymer resins, latexes, and combinations thereof.

In these or other methods, the settable composition further comprises at least one additive selected from the group consisting of a set retarding additive, a strength-retrogression additive, a set accelerator, a weighting agent, an aggregate, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, a water reducing additive, and combinations thereof.

Water may be present in an amount of about 25% to about 200% by weight of cementitious components. The water may be derived from a water source selected from the group consisting of culinary water, freshwater, saltwater, brine, seawater, recycled water, and combinations thereof.

In some methods, the settable composition is allowed to set in the well bore at a temperature of greater than 120° F. In some methods, the settable composition is allowed to set in the well bore in an annulus between a subterranean formation and a conduit in the well bore. In certain embodiments, the method includes squeezing the settable composition in an opening, the opening comprising at least one opening selected from the group consisting of an opening in a subterranean formation, an opening in a gravel pack, an opening in a conduit, and a micro-annulus between a cement sheath and a conduit.

Other variations provide a method of cementing comprising placing a settable composition and allowing the settable composition to set, wherein the settable composition comprises (a) remediated fly ash, (b) hydraulic cement, and (c) water, wherein the remediated fly ash contains fly ash and a natural or other pozzolan.

The remediated fly ash is preferably present in an amount sufficient to increase compressive strength of the settable composition, compared to an otherwise-equivalent settable composition without the remediated fly ash. The remediated fly ash may be present in an amount of about 1% to about 80% by weight of cementitious components in the settable composition, and the hydraulic cement may be present in an amount of about 1% to about 95% by weight of the cementitious components in the settable composition. The remediated fly ash may be characterized by a mean particle size of about 1 micron to about 400 microns.

In some methods, the settable composition further comprises a natural pozzolan. The natural pozzolan may be characterized by a mean particle size of about 0.5 microns to about 15 microns, for example.

In some methods, the settable composition further comprises calcium hydroxide and/or Type S lime.

The settable composition may be placed into a well bore, such as (but not limited to) an oil-field well bore. For example, the settable composition may be allowed to set in the well bore in an annulus between a subterranean formation and a conduit in the well bore.

DESCRIPTION OF SOME EMBODIMENTS

Certain embodiments of the present disclosure will now be further described in more detail, in a manner that enables the claimed invention to be understood so that a person of ordinary skill in this art can make use of the present disclosure.

Unless otherwise indicated, all numbers expressing reaction conditions, concentrations, yields, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this disclosure belongs. If a definition set forth in this section is contrary to or otherwise inconsistent with a definition set forth in patents, published patent applications, and other publications that are incorporated by reference, the definition set forth in this specification prevails over the definition that is incorporated herein by reference.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

As used herein, "RFA" refers to remediated fly ash, such as (but not limited to) Tephra® RFA marketed by CR Minerals Company, Pueblo, Colo., U.S. See U.S. Pat. No. 9,561,983, issued Feb. 7, 2017 and U.S. Pat. No. 9,611,174, issued Apr. 4, 2017, which are hereby incorporated by reference herein for their teachings of various embodiments of RFA applicable to the present invention.

RFA includes a fly ash and a remediation agent. The fly ash may be any type of fly ash, such as (but not limited to) waste fly ash, ASTM C618 Class C fly ash, ASTM C618 Class F fly ash, or another type of fly ash. The remediation agent may be a natural pozzolan, another type of pozzolan (other than fly ash), slag, silica fume, ground glass, unground expanded shale, unground expanded clay, rice husk ash, or a combination thereof.

The present invention relates to cementing operations and, more particularly, to compositions that comprise RFA with cement, calcium hydroxide, natural or other pozzolan, or a combination thereof, and methods of using such compositions. There may be several potential advantages to the methods and compositions of the present disclosure, only some of which may be alluded to herein. One of the many potential advantages of some embodiments is that the inclusion of RFA in the settable composition has been shown to increase the compressive strength of the settable composition. Another potential advantage of some embodiments is that the RFA, cement, Type S lime, calcium hydroxide, natural or other pozzolan, or a combination thereof may be used to reduce the amount of a higher-cost component, such as hydraulic cement, resulting in a more economical settable composition. Yet another potential advantage of some embodiments is that a reduction of the amount of cement in a settable composition will reduce the carbon footprint of the cementing operation.

The present disclosure facilitates the removal of poor-quality fly ash from the waste stream or existing fly ash landfill/waste deposit and converts it into a very useful product for which there is strong demand in the production of concrete for various infrastructure. The present disclosure is useful in oil field cementing slurries used to secure oil well casings as well as prevent loss of oil to the formation during extraction, among many other uses.

The present disclosure may be used by cement companies to produce a "1P cement" per ASTM C595 and/or a performance cement per ASTM C1157. 1P cements have been altered by the addition of a pozzolanic material to provide pozzolanic advantages to the concrete in which it is mixed. Pozzolanic qualities include, but are not limited to: mitigating one form of chemical attack or another, such as ASR, alkali-sulfate reactions, and the damaging effects of chloride ingress, particularly the oxidation and debonding of reinforcing steel; concrete densification and impermeability enhancement, increased long-term compressive strength, and mitigation of efflorescence.

Embodiments of the settable composition may comprise RFA with cement and/or calcium hydroxide, Type S lime, slag, silica fume, ground glass, a natural or other pozzolan, or a combination thereof. Embodiments of the settable composition further may comprise water, for example, in an amount sufficient to form a pumpable slurry. In one particular embodiment, the settable composition may comprise a cementitious component that comprises RFA and hydraulic cement. In another embodiment, the settable composition may comprise a cementitious component that comprises RFA and calcium hydroxide (lime). In yet another embodiment, the settable composition may comprise a cementitious component that comprises RFA, calcium hydroxide, and a natural pozzolan. In yet another embodiment, the settable composition may comprise a cementitious component that comprises RFA, hydraulic cement, calcium hydroxide, and a natural pozzolan. Other optional additives may also be included in the settable compositions as desired, including, but not limited to: fly ash, slag, phosphate cement, calcium sulfoaluminum (CSA) cement, Type S lime, ground glass, silica fume, or combinations thereof. Embodiments of the settable compositions may be foamed and/or extended to reduce the density of the cementitious compound as needed or desired by those of ordinary skill in the art.

The settable compositions of some embodiments preferably have a density suitable for a particular application as desired by those of ordinary skill in the art, with the benefit of this disclosure. In some embodiments, the settable compositions may have a density in the range of from about 8 pounds per gallon ("ppg") to about 16 ppg. In other embodiments, the settable compositions may be foamed to a density in the range of from about 8 ppg to about 13 ppg.

Embodiments of the settable composition generally include RFA. RFA may be a non-spec flue ash or non-spec fly ash or Class C fly ash that has been remediated through a beneficiation process utilizing a natural pozzolan or other pozzolan, slag, silica fume, ground glass, or a combination thereof as the remediation agent. Alternatively, or additionally, other types of fly ash may be utilized. The RFA includes fly ash combined with a natural or other pozzolan. By "combined" it is meant that the fly ash and natural or other pozzolan are physically mixed or ground together; chemical reactions will typically not occur without the addition of water, although chemical combinations (such as equilibrium exchange reactions) are by no means excluded.

This patent application hereby incorporates by reference herein U.S. Pat. No. 9,561,983, issued Feb. 7, 2017 and U.S. Pat. No. 9,611,174, issued Apr. 4, 2017, as disclosing RFA that may be used, without limitation, in the present invention.

A non-spec fly ash is waste material—usually derived from a coal-fired power generation plant—that has been designated for ponding or landfill due to the material's inability to meet industry standards related to chemical or physical specifications required for use in cement or concrete. Beneficiation with a remediation agent can transform or upgrade the non-spec fly ash into a spec fly ash (RFA) that meets all the standards of ASTM C1697, ASTM C618, and/or AASHTO M295 for certification and use in cementitious systems and concrete. The remediation agent may be a premium natural pozzolan, for example, to remediate a non-spec fly ash.

In some embodiments, the RFA is certified under ASTM C618 ("Standard Specification for Coal Fly Ash and Raw or Calcined Natural Pozzolan for Use in Concrete") or under ASTM C1697 ("Standard Specification for Blended Supplementary Cementitious Materials") as a Class C or Class F pozzolan. In these or other embodiments, the composition may be certified under AASHTO M295 ("Standard Specification for Coal Fly Ash and Raw or Calcined Natural Pozzolan for Use in Concrete") as a Class C or Class F pozzolan. Both ASTM C618 and AASHTO M295 are hereby entirely incorporated by reference herein. It is also noted that RFA compositions according to this disclosure may be alternatively, or additionally, certified under other standards or regulations, either presently existing or developed in the future, in the U.S. or other countries.

RFA generally outperforms both originally certified fly ashes, as well as raw natural pozzolans. In other words, the beneficiation of a non-spec ash or Class C fly ash with a natural pozzolan remediation agent, precisely blended, results in a superior supplemental cementitious material. This benefit affords the operator the ability to mix settable compositions at lower cost and increased performance.

It has been discovered (see the Examples herein) that the addition of RFA with hydraulic cement or calcium hydroxide, or both hydraulic cement and calcium hydroxide, provides unexpected increases in compressive strengths. In accordance with some embodiments, RFA may be used to increase the compressive strength of settable compositions comprising cement or calcium hydroxide. In addition, RFA may increase the compressive strength of settable compositions comprising hydraulic cement, lime, natural pozzolans, or a combination thereof. Without being limited by speculation, it is believed that the RFA provided herein is particularly suited for use at elevated well bore temperatures, such as at temperatures greater than about 80° F., greater than about 120° F., or greater than about 140° F.

In one embodiment, RFA may be used, among other things, to replace higher-cost cementitious components, such as Portland cement, resulting in more economical settable compositions. In addition, substitution of the Portland cement with the RFA should result in a settable composition with a reduced carbon footprint.

In some embodiments, RFA may be produced to any size suitable for use in cementing operations. In some embodiments, the RFA is produced to a mean particle size of about 1 micron to about 1000 microns, such as about, or at least about, or at most about 1, 10, 25, 50, 75, 100, 150, 200, 250, 300, 400, 500, 600, 700, 800, or 900 microns. The mean particle size corresponds to D50 (mid-point) values as measured by commercially available particle size analyzers, such as those manufactured by Malvern Instruments, Worcestershire, United Kingdom. In some embodiments, the RFA is produced to a minimum particle size of about 0.1, 0.5, 1, 5, 10, or 25 microns. In these or other embodiments, the RFA is produced to a maximum particle size of about 10, 50, 100, 200, 500, or 1000 microns.

In some embodiments, within the RFA, a natural pozzolan is present in a concentration of about 1 wt % to about 99 wt %, such as about 10 wt % to about 90 wt %, about 30 wt % to about 70 wt %, about 40 wt % to about 60 wt %, or about 60 wt % to about 70 wt % of the pozzolanic composition. In various embodiments, a natural pozzolan is present in the RFA in a concentration of about 1, 2, 5, 10, 15, 20, 25, 30, 35, 40, 45, 50, 55, 60, 65, 70, 75, 80, 85, 90, or 95 wt % of the RFA composition. In various embodiments, fly ash is present in the RFA in a concentration of about 1, 2, 5, 10, 15, 20, 25, 30, 35, 40, 45, 50, 55, 60, 65, 70, 75, 80, 85, 90, or 95 wt % of the RFA composition.

In some embodiments of the RFA composition, a weight ratio of the natural or other pozzolan to the fly ash is from about 0.01 to about 100, such as about 0.1 to about 10, or about 1 to about 2. In various embodiments, the weight ratio of the natural or other pozzolan to the fly ash is about 0.02, 0.05, 0.1, 0.2, 0.3, 0.5, 0.8, 1, 2, 3, 5, 8, 10, 15, 25, 50, 75, or 90, for example.

In some embodiments, a natural or other pozzolan is selected from the group consisting of pumice, pumicite, perlite, tuff, rhyolite, tephra, volcanic ash, calcined shale, calcined clay, metakaolin, silica fume, ground glass, diatomaceous earth, fumed silica, precipitated silica, colloidal silica, ignimbrites, vitrified calcium aluminosilicates, zeolites, opalines, ground waste glass, finely ground sand, and combinations or derivatives thereof. A preferred natural pozzolan may be a pozzolanic ash, such as (but not limited to) a pozzolan derived from pumice or perlite.

Pumice, and/or pumicite, a type of volcanic ash, is a volcanic rock that consists of highly vesicular rough textured volcanic glass, which may or may not contain crystals. Pumice is created when super-heated, highly pressurized rock is violently ejected from a volcano. Pumice is composed of highly micro-vesicular pyroclastic glass with thin, translucent bubble walls of extrusive igneous rock. It is commonly, but not exclusively, derived of silicic or felsic to intermediate composition magma (e.g., rhyolitic, dacitic, andesite, pantellerite, phonolite, or trachyte). Pumice is commonly pale in color, ranging from white, cream, blue or grey, to green-brown or black.

Perlite is an amorphous volcanic glass that has a relatively high water content, typically believed to be formed by the hydration of obsidian. Scoria is another vesicular volcanic rock that differs from pumice in having larger vesicles and thicker vesicle walls and being dark colored and denser.

Silica fume is an amorphous, ultrafine powder that may be obtained from silicon-ferrosilicon alloy production. Silica fume may meet specifications under ASTM C1240. Fumed silica may be obtained from flame pyrolysis of silicon tetrachloride or from quartz sand vaporized at high temperature in an electric arc. Precipitated silica may be produced by precipitation from a solution containing silicate salts. Colloidal silica is a suspension of fine amorphous, nonporous, and typically spherical silica particles in a liquid phase.

Ignimbrite is a volcanic rock consisting essentially of pumice fragments, formed by the consolidation of material deposited by pyroclastic flows.

Diatomaceous earth is a naturally occurring, soft, siliceous sedimentary rock that is readily converted into a fine powder.

Slag is a glass-like byproduct generated after a desired metal has been separated (i.e., smelted) from its raw ore. Slag is usually a mixture of metal oxides and silicon dioxide. Slags can contain metal sulfides and elemental metals. Ferrous and non-ferrous smelting processes produce different slags. The smelting of copper and lead in non-ferrous smelting, for instance, is designed to remove the iron and silica that often occurs with those ores, and separates them as iron-silicate-based slags. Slag from steel mills in ferrous smelting, on the other hand, is designed to minimize iron loss and mainly contains oxides of calcium, silicon, magnesium, and aluminum.

In some embodiments, slag is specifically ground-granulated blast-furnace slag. Ground-granulated blast-furnace slag may be obtained by quenching molten iron slag (a by-product of iron and steel-making) from a blast furnace in water or steam, to produce a glassy, granular product that is then dried and ground into a fine powder. This type of slag is also sometimes referred to as "slag cement." In certain embodiments, the slag employed herein meets specifications as a slag cement per ASTM C989.

In some embodiments, vitrified calcium aluminosilicate pozzolans may be made from recycled glass or fiberglass powders, from finely ground fresh glass powders, or a combination thereof.

In some embodiments, the natural or other pozzolan contains amorphous silica, amorphous alumina, and iron. The natural or other pozzolan of some embodiments is selected for its silica content. The natural or other pozzolan of some embodiments is selected for its alumina content. The natural or other pozzolan of some embodiments is selected for its combined silica/alumina and iron content.

In some embodiments, the natural or other pozzolan is selected for its high silica content and pozzolanic strength to be used as an additive to remediate poor quality fly ash to a degree that will transform the previously unusable fly ash into a useful RFA.

In some embodiments, the natural or other pozzolan is selected for its particle-size distribution, surface area, particle-shape distribution, density, viscosity, or other properties. For example, pumice-derived pozzolans may have an angular shape that sometimes creates higher water demand than fly ash pozzolans, which tend to have a spherical shape that creates less water demand.

In some embodiments, a natural or other pozzolan has a chemical content comprising a minimum of 85 wt % combined silica and alumina, and a calcium hydroxide content of less than 2 wt %.

Certain embodiments are predicated on fly ash remediating agents that are not necessarily pozzolanic, or less pozzolanic than natural or other pozzolans disclosed herein. In some embodiments, slag is employed as a remediating agent. Some embodiments thus provide a settable composition for cementing, the settable composition comprising (a) remediated fly ash, (b) cement and/or calcium hydroxide, and (c) optionally water, wherein the remediated fly ash contains fly ash and slag, and wherein the slag is present in the remediated fly ash in a concentration of about 1 wt % to about 99 wt %. Natural or other pozzolans may additionally be included, along with the slag.

In some embodiments, Type S lime is employed as a remediating agent. Some embodiments thus provide a settable composition for cementing, the settable composition comprising (a) remediated fly ash, (b) cement and/or calcium hydroxide, and (c) optionally water, wherein the remediated fly ash contains fly ash and Type S lime, and wherein the Type S lime is present in the remediated fly ash in a concentration of about 1 wt % to about 99 wt %. Natural or other pozzolans may additionally be included, along with the Type S lime.

The RFA composition may or may not include components in addition to the fly ash and the remediating agent. For example, additives or admixtures may also be introduced. These additives may be added to adjust the properties of the RFA composition itself, or to provide admixture properties for the ultimate cement or concrete. The RFA composition may comprise an additive to adjust viscosity. The RFA composition may further comprise an additive to adjust water demand of the composition in concrete. Also, impurities may be present.

In some embodiments, the RFA is blended with hydraulic Portland cement, slag, calcium hydroxide (lime), and/or Type S lime. In some embodiments, the RFA/cement mixture contains hydraulic cement in an amount of about 25% to about 75% by weight of the mixture and RFA in an amount of about 25% to about 75% by weight of the mixture. In one embodiment, the hydraulic cement may be a Portland cement classified as ASTM Type I-V cement or API spec Portland cements designated as Class A, Class B, Class C, Class G, or Class H. In accordance with embodiments, the hydraulic cement and RFA may be combined and produced to any size suitable for use in cementing operations. In other embodiments, the hydraulic cement and RFA may be sized prior to combination. In some embodiments, the RFA/cement mixture has a mean particle size of about 0.1 microns to about 400 microns, or about 0.5 microns to about 50 microns, such as 0.5 microns to about 10 microns. The mean particle size corresponds to D50 values as measured by commercially available particle size analyzers such as those manufactured by Malvern Instruments, Worcestershire, United Kingdom.

The RFA may be included in the settable compositions in an amount sufficient to provide the desired compressive strength, density, cost reduction, and/or reduced carbon footprint. In some embodiments, RFA may be present in the settable compositions in an amount of from about 0.1% to about 99% by weight of cementitious components, preferably from about 1% to about 80% by weight of cementitious components. Cementitious components include those components or combinations of components of the settable compositions that hydraulically set, or otherwise harden, to develop compressive strength, including, for example, RFA, calcium hydroxide, fly ash, natural pozzolan, slag, calcium sulfoaluminum, ground glass, silica fume, and the like.

The RFA may be present, in various embodiments, in an amount of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95% by weight of the cementitious components. In some embodiments, the RFA may be present in the settable composition in an amount from about 5% to about 50% by weight of cementitious components. In other embodiments, the RFA may be present in an amount from about 10% to about 50% by weight of cementitious components. In yet other embodiments, the RFA may be present in an amount from about 20% to about 40% by weight of cementitious components. One of ordinary skill in the art, with the benefit of this disclosure, will recognize the appropriate amount of RFA to include for a chosen application, or can readily determine an appropriate amount of RFA by routine experimentation.

Embodiments of the settable compositions generally may comprise calcium hydroxide. The chemical analysis of calcium hydroxide (lime) varies from manufacturer to manufacturer depending on a number of factors, including the particular kiln feed, or the exact chemistries of the limestone quarried from mines located near the production plants.

Some forms of calcium hydroxide (lime) contain a percentage of non-limestone materials, such as dolomite and siliceous rock. This type of lime is commonly referred to as "Type S lime." The pure form of calcium hydroxide is simply referred to as lime or calcium hydroxide. Type S lime is typically characterized by high early plasticity, high water-retention values, limited oxide content, and minimal coarse fraction. In some embodiments, the Type S lime utilized herein meets specifications for Type S hydrated lime in ASTM C206 and/or ASTM C207.

The calcium hydroxide and/or Type S lime generally may exhibit cementitious properties, in that it may set and harden in the presence of water and RFA, a natural pozzolan, or a combination thereof. In accordance with embodiments of the present invention, the calcium hydroxide may be used, among other things, to replace higher-cost cementitious components, such as Portland cement, resulting in more economical settable compositions. In addition, substitution of the Portland cement with the calcium hydroxide can result in a settable composition with a reduced carbon footprint.

The calcium hydroxide and/or Type S lime may be included in the settable compositions in an amount sufficient to provide the desired compressive strength, density, cost reduction, and/or reduced carbon footprint. In some embodiments, the calcium hydroxide and/or Type S lime may be present in the settable compositions of the present invention in an amount from about 1% to about 95% by weight of cementitious components. The calcium hydroxide and/or Type S lime may be present, in certain embodiments, in an amount of about 5%, about 10%, about 15%, about 20%, about 25%, about 30%, about 35%, about 40%, about 45%, or about 50% by weight of cementitious components. One of ordinary skill in the art, with the benefit of this disclosure, will recognize the appropriate amount of calcium hydroxide and/or Type S lime (if any) to include for a chosen application.

Embodiments of the settable compositions further may comprise a natural pozzolan. The definition of a natural pozzolan is: "A raw or calcined natural material (such as volcanic ash) which has pozzolanic properties" according to the American Concrete Institute (ACI). The definition of a pozzolan is as follows: "A siliceous or silico-aluminous material that will, in finely divided form and in the presence of moisture, chemically react with calcium hydroxide at ordinary temperatures to form compounds having cementitious properties (there are both natural and artificial pozzolans)" according to ACI.

Generally speaking, a natural pozzolan (NP) is a glassy (non-crystalline) siliceous rock consisting principally of amorphous silica and amorphous alumina that exhibits cementitious properties in the presence of hydrated lime (calcium hydroxide) and water. Natural pozzolans include volcanic or volcanic-derived materials such as pumice, pumicite, tuff, ignimbrite, rhyolite, tephra, perlite, and volcanic ash. Natural pozzolans also include certain amorphous opalines, zeolites, diatomaceous earth (DE), calcined clays (such as metakaolin), and calcined shales. Calcium hydroxide may be used in combination with the natural pozzolan, for example, to provide sufficient calcium for the natural pozzolan to set into a binder known as calcium silicate hydrate (CSH). This is the binder produced by Portland cements and water. It is also produced when water, calcium hydroxide (lime), and pozzolans are combined. In accordance with embodiments of the present invention, the natural pozzolan may be used, among other things, to replace higher-cost cementitious components, such as Portland cement, resulting in more economical settable compositions. As previously indicated, replacement of the Portland cement should also result in a settable composition with a reduced carbon footprint.

Where present, the natural pozzolan may be included in an amount sufficient to provide the desired compressive strength, density, cost reduction and/or reduced carbon footprint for a particular application. In some embodiments, the natural pozzolan may be present in the settable composition in an amount from about 1% to about 95% by weight of cementitious components. For example, the natural pozzolan may be present in an amount of about 5%, about 10%, about 15%, about 20%, about 25%, about 30%, about 35%, about 40%, about 45%, or about 50% by weight of cementitious components. In some embodiments, the natural pozzolan may be present in the settable compositions in an amount in the range of from about 5% to about 50% by weight of cementitious components. In other embodiments, the natural pozzolan may be present in an amount from about 5% to about 40% by weight of cementitious components. In yet other embodiments, the natural pozzolan may be present in an amount from about 10% to about 30% by weight of cementitious components. Of the natural pozzolan contained in the overall settable composition, any portion of the natural pozzolan (including from none to all) may be contained in the remediated fly ash. One of ordinary skill in the art, with the benefit of this disclosure, will recognize the appropriate amount of the natural pozzolan to include for a chosen application.

The water that may be used in embodiments of the settable composition may include, for example, culinary water, freshwater, saltwater (e.g., water containing one or more salts dissolved therein), brine (e.g., saturated saltwater produced from subterranean formations), seawater, recycled water (e.g., water pumped out during drilling operations), or combinations thereof. Generally, the water may be from any source, provided that the water does not contain an excess of compounds that may undesirably affect other components in the settable composition. In some embodiments, the water may be included in an amount sufficient to form a pumpable slurry. In some embodiments, the water may be included in the settable composition in an amount in the range of about 40% to about 200% by weight of cementitious components. In some embodiments, the water may be included in an amount of about 40% to about 150% by weight of cementitious components. One of ordinary skill in the art, with the benefit of this disclosure, will recognize the appropriate amount of water to include for a chosen application.

Embodiments of the settable compositions further may comprise lime. In certain embodiments, the lime may be hydrated lime, such as (but not limited to) Type S hydrated lime. The calcium hydroxide or Type S lime may be included in embodiments of the settable compositions, for example, to form a hydraulic composition with other components of the settable compositions, such as the RFA, natural pozzolans, fly ash, and/or slag. Where present, the calcium hydroxide or Type S lime may be included in the settable compositions in an amount sufficient for a particular application. In some embodiments, the lime (e.g., as calcium hydroxide, Type S lime, or a combination thereof) may be present in an amount from about 1% to about 40% by weight of cementitious components. For example, the lime (e.g., as calcium hydroxide, Type S lime, or a combination thereof) may be present in an amount of about 5%, about 10%, about 15%, about 20%, about 25%, about 30%, or about 35% by weight of cementitious components. One of ordinary skill in the art, with the benefit of this disclosure, will recognize the appropriate amount of the lime (if any) and/or Type S lime to include for a chosen application.

It should be understood that use of Portland cement in embodiments of the settable compositions can be reduced or even eliminated to provide, for example, cost savings and/or reduced carbon footprint. Accordingly, embodiments of the settable compositions of the present invention may comprise Portland cement in an amount of 0% to about 75% by weight of cementitious components. For example, Portland cement may be present in an amount of about 1%, about 5%, about 10%, about 15%, about 20%, about 25%, about 30%, about 35%, about 40%, about 45%, about 50%, about 55%, about 60%, about 65%, or about 70% by weight of cementitious components. In some embodiments, the Portland cement may be present in an amount from about 0% to about 20% by weight of cementitious components. In other embodiments, the Portland cement may be present in an amount from about 0% to about 10% by weight of cementitious components. In yet other embodiments, the settable compositions may be essentially free of Portland cement, which means less than 1.0% by weight of cementitious components.

The Portland cements include those classified as Classes A, B, C, G, and H cements according to American Petroleum Institute, API Specification for Materials and Testing for Well Cements, API Specification 10, Fifth Ed., Jul. 1, 1990. In addition, the Portland cements include those classified as ASTM C150 Type I, II, III, IV, or V.

One example of a suitable hydraulic cement comprises a mixture of Portland cement and a natural pozzolan. In some embodiments, the cement/natural pozzolan mixture contains Portland cement in an amount of about 25% to about 75% by weight of the mixture and natural pozzolan in an amount of about 25% to about 75% by weight of the mixture. In some embodiments, the cement/natural pozzolan mixture contains about 40% Portland cement by weight and about 60% natural pozzolan by weight. In accordance with various embodiments, the Portland cement and natural pozzolan may be combined and ground to any size suitable for use in cementing operations. In other embodiments, the Portland cement and natural pozzolan may be ground prior to combination. In some embodiments, the cement/natural pozzolan mixture of Portland cement and natural pozzolan has a mean particle size of about 0.1 microns to about 400 microns, such as about 0.5 microns to about 50 microns, or about 0.5 microns to about 10 microns. The mean particle size corresponds to D50 values as measured by commercially available particle size analyzers such as those manufactured by Malvern Instruments, Worcestershire, United Kingdom.

It is believed that hydraulic cement interground or blended with natural pozzolan, when used in a settable composition in combination with RFA, may provide synergistic effects. For example, it is believed that the combination of RFA and the cement/natural pozzolan mixture may provide significantly higher compressive strength, particularly at elevated well bore temperatures. Accordingly, the combination of RFA and the cement/natural pozzolan mixture may be particularly suited for use in settable compositions at elevated well bore temperatures, such as at temperatures greater than about 80° F., greater than about 120° F., or greater than about 140° F.

Embodiments of the settable compositions further may comprise fly ash as an additional component, distinct from the RFA. A variety of fly ashes may be suitable, including fly ash classified as Class C or Class F fly ash according to American Petroleum Institute, API Specification for Materials and Testing for Well Cements, API Specification 10, Fifth Ed., Jul. 1, 1990. Note that this API Specification refers to ASTM C618 for classification of fly ash types Class C and Class F. Natural pozzolans, Type N, are also included in ASTM C618. Class C fly ash comprises both silica and lime so that, when mixed with water, it may set to form a hardened mass. Class F fly ash generally does not contain sufficient lime, so an additional source of calcium ions is typically required for the Class F fly ash to form a hydraulic composition. In some embodiments, lime may be mixed with Class F fly ash in an amount in the range of about 0.1% to about 25% by weight of the fly ash. Typically, the lime is hydrated lime, i.e. calcium hydroxide.

Where present, fly ash generally may be included in the settable compositions in an amount sufficient to provide the desired compressive strength, density, and/or cost. In some embodiments, when present, fly ash may be present in the settable compositions in an amount of about 1% to about 99% by weight of cementitious components. In some embodiments, the fly ash may be present in an amount in the range of about 10% to about 60% by weight of cementitious components. One of ordinary skill in the art, with the benefit of this disclosure, will recognize the appropriate amount of the fly ash (if any) to include for a chosen application.

Embodiments of the settable compositions further may comprise slag. Slag generally does not contain sufficient basic or alkali material, so the slag (or the settable composition in general) further may comprise a base to produce a hydraulic composition that may react with water to set to form a hardened mass. Examples of suitable sources of bases include, but are not limited to, sodium hydroxide, sodium bicarbonate, sodium carbonate, calcium hydroxide, and combinations thereof. Slag may meet specifications of ASTM C989, in some embodiments.

Where present, the slag generally may be included in the settable compositions in an amount sufficient to provide the desired compressive strength, density, and/or cost. In some embodiments, the slag may be present in the settable compositions in an amount of about 1% to about 75% by weight of cementitious components. In some embodiments, the slag may be present in an amount in the range of about 5% to about 50% by weight of cementitious components. One of ordinary skill in the art, with the benefit of this disclosure, will recognize the appropriate amount of the slag (if any) to include for a chosen application.

Embodiments of the settable compositions further may comprise a calcined natural pozzolan such as metakaolin. Generally, metakaolin is a calcined natural pozzolan that may be prepared by heating kaolin clay, for example, to temperatures in the range of about 600° C. to about 800° C. In some embodiments, the metakaolin may be present in the settable compositions in an amount of about 1% to about 75% by weight of cementitious components. In some embodiments, the metakaolin may be present in an amount of about 10% to about 50% by weight of cementitious components. One of ordinary skill in the art, with the benefit of this disclosure, will recognize the appropriate amount of the metakaolin (if any) to include for a chosen application.

Embodiments of the settable compositions further may comprise a calcined natural pozzolan such as calcined shale. Among other things, calcined shale, when included in the settable compositions, may react with excess lime to form a suitable cementing material, for example, calcium silicate hydrate. A variety of shales may be suitable, including those comprising silicon, aluminum, calcium, and/or magnesium. A suitable shale comprises a vitrified (calcined) and finely divided shale.

Where present, the calcined shale may be included in the settable compositions in an amount sufficient to provide the desired compressive strength, density, and/or cost. In some embodiments, the shale may be present in the settable compositions in an amount of about 1% to about 75% by weight of cementitious components. In some embodiments, the shale may be present in an amount in the range of about 10% to about 35% by weight of cementitious components. One of ordinary skill in the art, with the benefit of this disclosure, will recognize the appropriate amount of the shale (if any) to include for a chosen application.

Embodiments of the settable compositions further may comprise pozzolanic zeolites. Zeolites generally are porous aluminosilicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Pat. No. 7,445,669, which is hereby incorporated by reference. An example of a suitable source of zeolitic pozzolan is available from Bear River Zeolite, Preston, Id., U.S. In some embodiments, the zeolite may be present in the settable compositions in an amount in the range of about 1% to about 65% by weight of cementitious components. In certain embodiments, the zeolite may be present in an amount of about 10% to about 40% by weight of cementitious components. One of ordinary skill in the art, with the benefit of this disclosure, will recognize the appropriate amount of the zeolite (if any) to include for a chosen application.

Embodiments of the settable compositions further may comprise a set retarding additive. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, organic acids (e.g., hydroxycarboxy acids), copolymers that comprise acrylic acid or maleic acid, or combinations thereof. Generally, where used, the set retarding additive may be included in the settable compositions in an amount sufficient to provide the desired set retardation. In some embodiments, the set retarding additive may be present in the settable compositions an amount of about 0.1% to about 5% by weight of cementitious components. One of ordinary skill in the art, with the benefit of this disclosure, will recognize the appropriate amount of the set retarding additive to include for a chosen application.

Optionally, other additional additives may be added to the settable compositions of the present invention as deemed appropriate by one skilled in the art, with the benefit of this disclosure. Examples of such additives include, but are not limited to, strength-retrogression additives, set accelerators, weighting agents, fine and coarse aggregates, lightweight additives, gas-generating additives, mechanical property enhancing additives, lost-circulation materials, filtration-control additives, dispersants, fluid loss control additives, defoaming agents, foaming agents, oil-swellable particles, water-swellable particles, thixotropic additives, water reducers, or combinations thereof. Specific examples of these, and other, additives include crystalline silica, amorphous silica fume, fumed silica, salts, fibers (e.g., cellulose fiber), hydratable clays, microspheres, rice husk ash, elastomers, elastomeric particles, resins, latex, combinations thereof, and the like. A person having ordinary skill in the art, with the benefit of this disclosure, will readily be able to determine the type and amount of additives useful for a particular application and desired result.

As will be appreciated by those of ordinary skill in the art, embodiments of the settable compositions may be used in a variety of subterranean applications, including primary and remedial cementing. Embodiments of the settable compositions may be introduced into a subterranean formation and allowed to set therein. For example, the settable composition may be placed into a space between a subterranean formation and a conduit located in the subterranean formation. Embodiments of the cement compositions may comprise, for example, water and one or more of RFA, hydraulic cement, calcium hydroxide, and natural pozzolan.

In primary cementing embodiments, for example, a settable composition may be introduced into a space between a subterranean formation and a conduit (e.g., pipe strings or liners) located in the subterranean formation. The settable composition may be allowed to set to form an annular sheath of hardened cement paste in the space between the subterranean formation and the conduit. Among other things, the settable composition may form a barrier, preventing the migration of fluids in the well bore. The settable composition also may, for example, support the conduit in the well bore.

In remedial cementing embodiments, a settable composition may be used, for example, in squeeze-cementing operations or in the placement of cement plugs. By way of example, the settable composition may be placed in a well bore to plug a void or crack in the formation, in a gravel pack, in the conduit, in the cement sheath, and/or a microannulus between the cement sheath and the conduit.

In some variations, a concrete product or structure is provided, comprising the cementitious mixture as disclosed, or a reaction product thereof. In some variations, a concrete product or structure is provided, comprising a pozzolanic composition or a reaction product thereof, wherein the pozzolanic composition comprises fly ash combined with a natural pozzolan. The concrete products or structures are not particularly limited.

Some variations provide a structure (e.g., cement sheath) containing a hardened material derived from a settable composition comprising:
(a) remediated fly ash;
(b) one or more of: (i) cement, (ii) calcium hydroxide, or (iii) Type S lime; and
(c) water,
wherein the remediated fly ash contains fly ash and a natural or other pozzolan, and wherein the natural or other pozzolan is present in the remediated fly ash in a concentration of about 1 wt % to about 99 wt %.

Other variations provide a method of cementing comprising placing a settable composition into a well bore and allowing the settable composition to set, wherein the settable composition comprises:
(a) remediated fly ash;
(b) one or more of: (i) cement, (ii) calcium hydroxide, or (iii) Type S lime; and
(c) water,
wherein the remediated fly ash contains fly ash and a natural or other pozzolan.

Other variations provide a method of cementing comprising placing a settable composition and allowing the settable composition to set, wherein the settable composition comprises (a) remediated fly ash, (b) hydraulic cement, and (c) water, wherein the remediated fly ash contains fly ash and a natural or other pozzolan.

EXAMPLES

Tephra® RFA (CR Minerals Company, Pueblo, Colo., U.S.) is a patented, remediated fly ash that is a high-performance, high-surface-area pozzolan that meets or exceeds all criteria for ASTM C618 Class F fly ash. The Tephra® RFA has a bulk density of 45 lb/ft$^3$, with at least 90% of the particles passing a 325-mesh screen.

FIGS. 1 to 4 present experimental data for the use of RFA in mix designs when replacing fly ash with RFA, or adding RFA to fly ash, in cement slurries relevant to oil field applications. FIG. 1 (experiments 1-6) is a control mix design with no RFA. FIG. 2 (experiments 7-10) is a cement-based mix design employing RFA at various concentrations (20-40 wt % on a dry basis). FIG. 3 (experiments 11-14) is a cement/lime-based mix design employing RFA at various concentrations (28.5-57 wt % on a dry basis). FIG. 4 (experiments 15-18) is a lime-based mix design employing RFA at various concentrations (37-74 wt % on a dry basis).

In all experiments 1-18, a water/solids weight ratio of 0.5 was used without any water reducers or other admixtures. The concentrations in these tables are based on all components present except water (i.e., dry basis). The natural pozzolan is pumicite, in all cases when present.

The mix design itself is a slurry (grout) design which allowed for the use of 2"×4" cylinders to produce the samples. This simplified the batching and curing process in terms of time and available space. Also, no aggregate is included the mix design. These samples rely on the hydraulic and pozzolanic reactions and subsequent relative strengths between the various cementitious ingredients alone.

The 7-day and 28-day strength values are compressive strengths measured after curing for these time periods for which temperature was held constant at 73° F. The strength data shown is compressive strength in pounds/sq. inch (lbs/in$^2$ or psi). The 28-day compressive strength is improved upon addition of RFA to the mix design.

These experiments demonstrate significant differences in oil field slurry performance between a standard Class F fly ash versus a remediated class F fly ash (RFA).

All publications, patents, and patent applications cited in this specification are incorporated herein by reference in their entirety as if each publication, patent, or patent application was specifically and individually put forth herein, including (but not limited to) ASTM C618, AASHTO M295, ASTM C1697, API Spec 10A, and ISO Standard 10426-1.

In this detailed description, reference has been made to multiple embodiments of the disclosure and non-limiting examples relating to how the disclosure can be understood and practiced. Other embodiments that do not provide all of the features and advantages set forth herein may be utilized, without departing from the spirit and scope of the present disclosure. This disclosure incorporates routine experimentation and optimization of the methods and systems described herein. Such modifications and variations are considered to be within the scope of the invention defined by the claims.

Where methods and steps described above indicate certain events occurring in certain order, those of ordinary skill in the art will recognize that the ordering of certain steps may be modified and that such modifications are in accordance with the variations of the disclosure. Additionally, certain of the steps may be performed concurrently in a parallel process when possible, as well as performed sequentially.

Therefore, to the extent that there are variations of the disclosure, which are within the spirit of the disclosure or equivalents of the appended claims, it is the intent that this patent will cover those variations as well. The present disclosure shall only be limited by what is claimed.

What is claimed is:

1. A settable composition for cementing, the settable composition comprising (a) remediated fly ash, (b) cement and/or calcium hydroxide, and (c) optionally water, wherein said remediated fly ash contains non-spec fly ash and a natural pozzolan, wherein said non-spec fly ash does not meet specifications under ASTM C618, ASTM C1697, and/or AASHTO M295, wherein said natural pozzolan is present in said remediated fly ash in a concentration of about 1 wt % to about 99 wt %, and wherein said remediated fly ash is pozzolanic.

2. The settable composition of claim 1, wherein said natural pozzolan is a pozzolanic ash.

3. The settable composition of claim 1, wherein said natural pozzolan is derived from pumice, perlite, ignimbrites, or any other volcanic material.

4. The settable composition of claim 1, wherein said natural pozzolan is selected from the group consisting of pumice, pumicite, perlite, volcanic ash, metakaolin, diatomaceous earth, silica fume, precipitated silica, colloidal silica, ignimbrites, vitrified calcium alumino-silicates, ground waste glass, calcined shale, calcined clay, zeolites, and combinations thereof.

5. The settable composition of claim 1, wherein said remediated fly ash is characterized in that at least 90% of particles of said remediated fly ash pass a 325-mesh screen.

6. The settable composition of claim 1, wherein said remediated fly ash is characterized by a bulk density of about 45 lb/ft$^3$.

7. The settable composition of claim 1, wherein said remediated fly ash is characterized by a mean particle size of about 1 micron to about 400 microns.

8. The settable composition of claim 1, wherein said remediated fly ash is present in an amount of about 1% to about 80% by weight of cementitious components in said settable composition.

9. The settable composition of claim 1, wherein said remediated fly ash further contains slag.

10. The settable composition of claim 1, wherein said settable composition has a density of about 8 pounds per gallon to about 16 pounds per gallon.

11. The settable composition of claim 1, wherein said settable composition comprises cement, and wherein said cement is Portland cement.

12. The settable composition of claim 1, wherein said settable composition comprises calcium hydroxide.

13. The settable composition of claim 12, wherein said settable composition comprises Type S lime that contains said calcium hydroxide.

14. The settable composition of claim 1, wherein said settable composition further comprises at least one additive selected from the group consisting of slag, crystalline silica, amorphous silica fume, fumed silica, sodium hydroxide, calcium chloride, sodium chloride, glass fiber, polymer fiber, hydratable clay, biomass ash, crushed glass, elastomers, polymer resins, latexes, and combinations thereof, wherein said additive is different than said remediated fly ash.

15. The settable composition of claim 1, wherein said settable composition further comprises at least one additive selected from the group consisting of a set retarding additive, a strength-retrogression additive, a set accelerator, a weighting agent, an aggregate, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, a water reducing additive, and combinations thereof.

16. The settable composition of claim 1, wherein said water is present.

17. The settable composition of claim 16, wherein said water is present in an amount of about 25% to about 200% by weight of cementitious components.

18. The settable composition of claim 16, wherein said water comprises at least one water source selected from the group consisting of culinary water, freshwater, saltwater, brine, seawater, recycled water, and combinations thereof.

19. A structure containing a hardened material derived from a settable composition comprising:
(a) remediated fly ash;
(b) one or more of: (i) cement, (ii) calcium hydroxide, or (iii) Type S lime; and
(c) water,
wherein said remediated fly ash contains non-spec fly ash and a natural pozzolan, wherein said non-spec fly ash does not meet specifications under ASTM C618, ASTM C1697, and/or AASHTO M295, wherein said natural pozzolan is present in said remediated fly ash in a concentration of about 1 wt % to about 99 wt %, and wherein said remediated fly ash is pozzolanic.

* * * * *